May 26, 1959
R. G. ALLEN
2,888,131
ARTICLE TRANSFER MECHANISM
Filed July 27, 1954
2 Sheets-Sheet 1
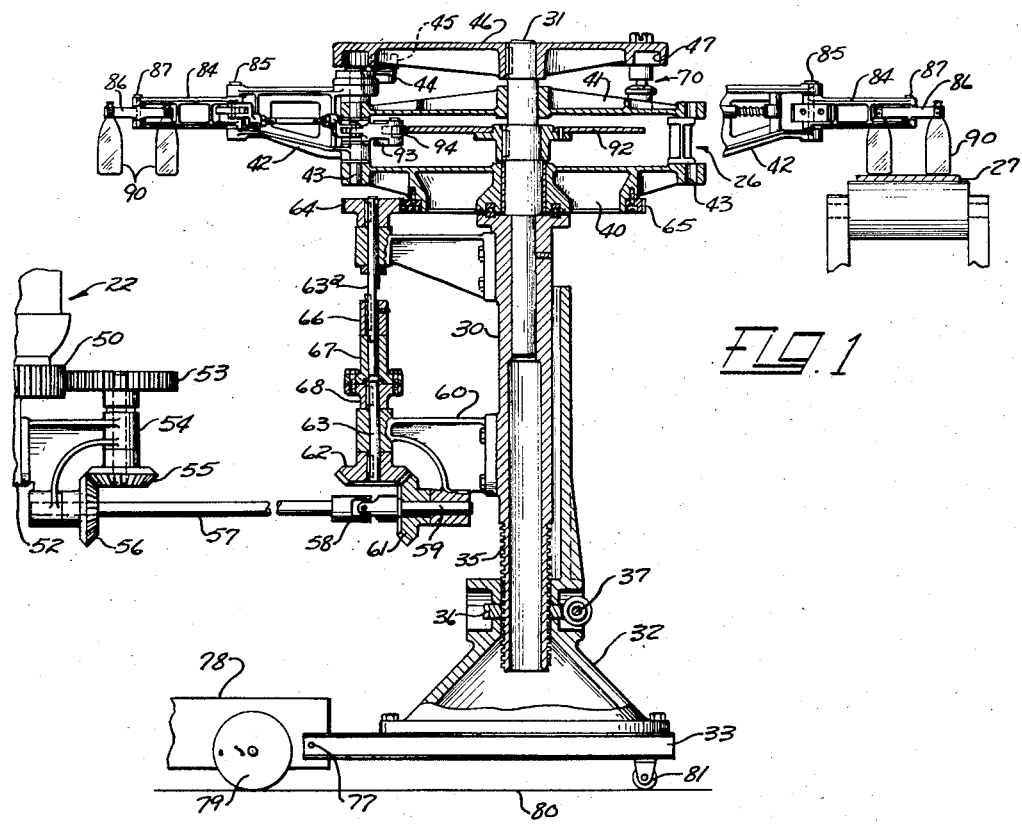
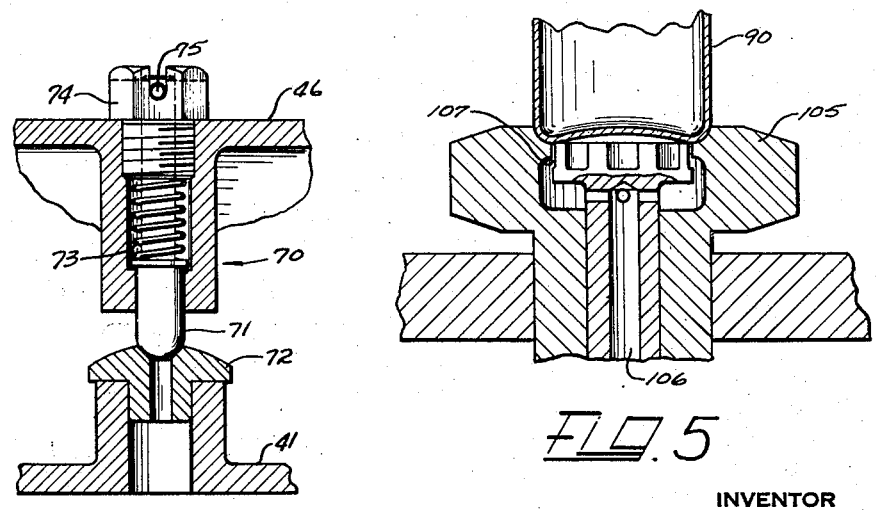
INVENTOR
RUSSELL G. ALLEN
BY
Rule & Hoge
ATTORNEYS

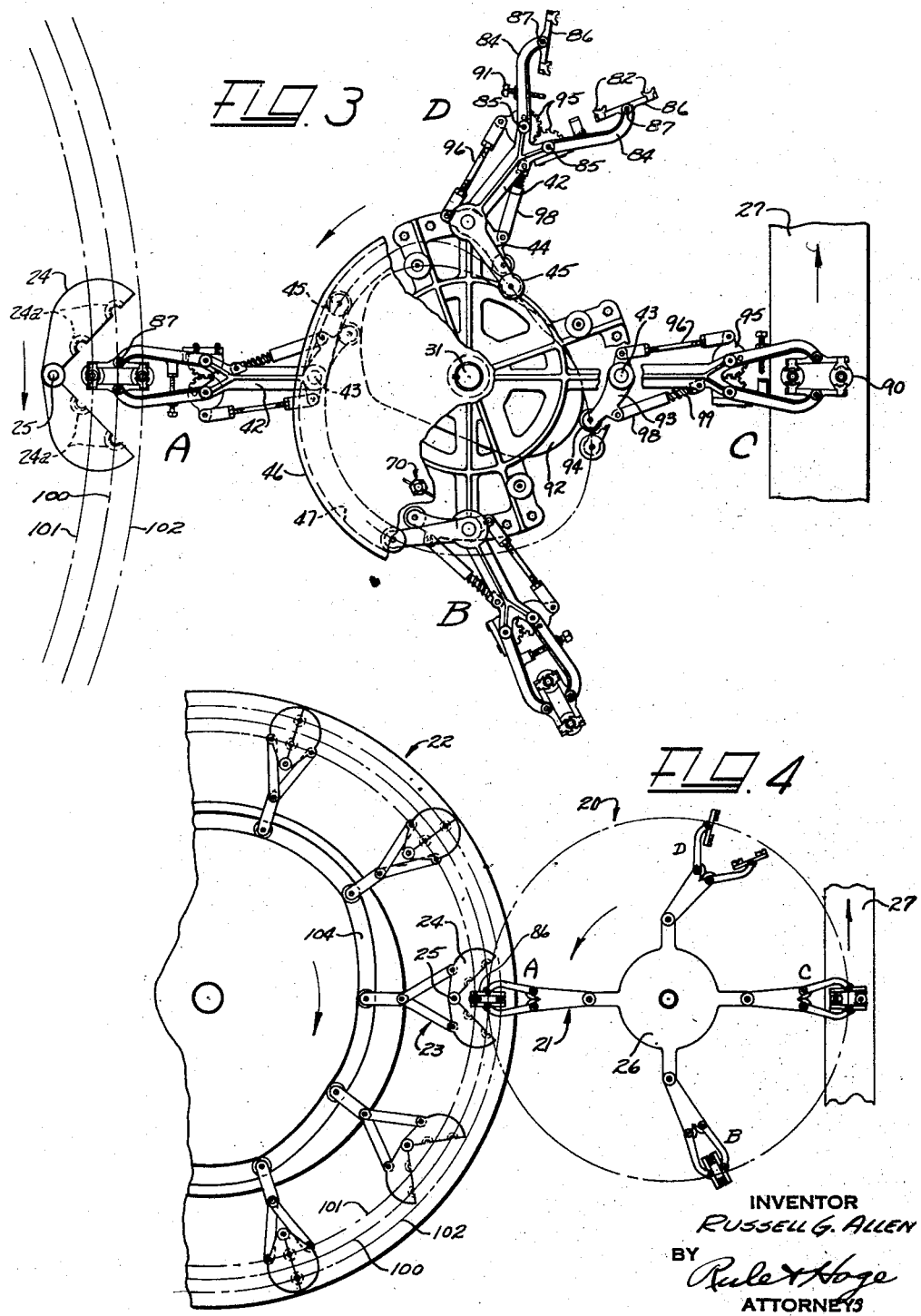

United States Patent Office 2,888,131
Patented May 26, 1959

2,888,131

ARTICLE TRANSFER MECHANISM

Russell G. Allen, Godfrey, Ill., assignor to Owens-Illinois Glass Company, a corporation of Ohio Application July 27, 1954, Serial No. 446,043

12 Claims. (Cl. 198—210)

My invention relates to means for transferring articles from one position to another and provides a machine adapted for taking articles such as bottles, jars or the like from forming molds, as for example the molds of a glass blowing machine and transferring them to article receiving means such as a conveyor by which the articles may be carried to an annealing lehr.

The invention in the form herein illustrated and described is particularly adapted for taking bottles from the finishing molds of a bottle blowing machine and transferring them to a travelling conveyor. It comprises a take-out machine including a carriage or turret rotatable about a vertical axis and provided with radially disposed arms each carrying a pair of tongs adapted to take hold of a bottle or bottles as the latter are discharged from the open molds of the blowing machine. The bottles may be held by suction on the mold bottoms of the finishing molds as the latter are opened to discharge the bottles. As the tongs close on the bottles the vacuum is released permitting them to be carried by the tongs. The opening and closing movements of the tongs are cam controlled. The carrying frames or arms on which the tongs are mounted are also cam controlled in a manner to cause the tongs to travel with and at the same speed as the mold during the transfer of the articles to the tongs. The speed of the tongs is reduced during the release of the articles to the travelling conveyor.

Referring to the accompanying drawings:

Fig. 1 is a vertical section of the take-out machine and its driving means;

Fig. 2 is a detailed sectional view of a holding device for holding the rotary turret of the take-out machine stationary in a position to prevent interference with the glass blowing machine while the turret is not rotating;

Fig. 3 is a plan view with parts broken away, of the take-out machine and a portion of the glass blowing machine;

Fig. 4 is a diagrammatic plan view showing the relation of the take-out apparatus and blowing machine; and Fig. 5 is a detail view showing a bottle held by suction on the mold bottom.

Referring particularly to Fig. 4, the invention in the form illustrated comprises the take-out machine 20 provided with four take-out units or arms 21 equally spaced about the axis of the machine. A bottle blowing machine, herein shown as a ten-arm machine, comprises a mold carriage 22 on which are mounted ten equally spaced arms or units 23. Each unit includes a finishing mold 24 comprising partible mold sections which swing about a pivot 25 to and from a closed position. The mold carriage 22 is rotated continuously and each finishing mold is opened as it approaches the transfer or take-out station A. The take-out machine comprises a turret or carriage 26 which is rotated continuously, thereby bringing the transfer units 21 into position to receive the blown articles from the molds 24 and transfer them to a horizontally travelling conveyor 27.

Referring to Fig. 1 the take-out machine comprises a vertical stationary column 30 including a lower tubular section and an upper section 31 telescoped therewith and keyed thereto. The column 30 is mounted in a frame 32 bolted to the machine base 33. The column is adjustable up and down for adjusting the transfer arms vertically. For this purpose the column 30 is formed with a screw thread 35 to receive a worm gear 36 rotatable by means of a manually rotated worm shaft 37.

Mounted for rotation on the upper section 31 of the stationary column is the carriage or turret 26 including lower and upper spiders 40 and 41 respectively. Each of the transfer units 21 comprises a tong carrying frame 42 pivoted at 43 to the turret for horizontal swinging movement. Each frame 42 is in the form of an arm extending outwardly from the turret and a second arm 44 extending from the pivot approximately at right angles to the arm 42 and carrying a cam follower roll 45. A stationary cam plate 46 is keyed to the upper end portion of the shaft 31 and is formed on its under surface with a continuous cam track 47 in which the rolls 45 run. The cam track is shaped to control the swinging movements of the tong carrying frames 42 for accelerating the movement of the tongs to correspond with the speed of the molds while the articles are being transferred to the tongs and thereafter slowing down the tongs to the speed of the conveyor 27 while discharging the articles thereto, all as hereinafter described.

The turret 26 is rotated continuously at a constant speed, being driven from the machine 22 through a train of gearing as follows:

A ring gear 50 (Fig. 1) on the continuously rotating machine carriage drives a gear 53 on a shaft journalled in a bracket 54 mounted on the machine frame 52. Intermeshing bevel gears 55 and 56 transmit the motion to a horizontal shaft 57 which is connected through a universal joint 58 to a stud shaft 59 journalled in a bracket 60 attached to the center column 30. Intermeshing gears 61 and 62 are keyed respectively to the shaft 59 and a vertical shaft 63 journalled in the bracket 60. Gear 64 keyed to the upper end of the shaft 63 meshes with a ring gear 65 on the turret 26.

The rotation of the blowing machine carriage operates through the train of gearing just described to rotate the take-out turret 26 in synchronism therewith. In the particular construction shown the mold carriage has ten units and the take-out machine four units. The gearing is so proportioned that the take-out machine makes 2½ complete rotations for one rotation of the mold carriage so that as each mold is brought to the transfer station A, a pair of tongs is brought into cooperative position for receiving the articles from the open mold at said station.

The shaft 63 is made in sections, permitting the upper section 63ᵃ to be disconnected from the lower section when it is desired to permit take-out turret to remain at rest while the blowing machine is operating. A sleeve 66 splined on the section 63ᵃ is movable upwardly to disconnect it from a sleeve member 67 which has driving connection with the lower shaft section through a spline 68. This breaks the driving connection between the mold carriage and the turret 26. When the turret is disconnected it may be rotated manually to a predetermined stop position to prevent interference with the rotating parts of the blowing machine. Means for locating and holding the turret in such stop position comprises a holding device 70 (Figs. 1 and 2). This includes a detent 71 which seats in a recessed head 72 mounted in the section 41 of the turret. The detent 71 is in the form of a vertical shaft loaded by a spring 73. The shaft 71 is movable freely through a tubular stud bolt 74 threaded in the plate 46. A pin 75 in the upper end of the shaft 71 is adapted to seat in grooves formed in the head of the bolt 74 for either holding the detent retracted or permitting it to move downward into a holding position.

The take-out machine is connected to the blowing machine for bodily movement therewith to and from an operating position in which the machine receives its mold charges of molten glass from the furnace or glass feeder. For this purpose the base 33 of the take-out machine has a connection 77 with the base 78 of the blowing machine which is mounted on wheels 79 to run on a track 80. The base 33 is also provided with wheels 81 to run on said track.

Each of the frames 42 carries a pair of tong arms 84 connected by pivots 85 to the frame 42. Each arm 84 carries at its outer end a holder 86 for holding the bottles 90 during the transfer. In the apparatus as shown double molds 24 are used, each mold half having two mold cavities 24ᵃ so that two bottles are simultaneously discharged from each mold. Each holder 86 is provided with jaws 82 at its ends, spaced apart the same distance as the mold cavities 24ᵃ. The holders 86 are connected to the tong arms 84 by pivot pins 87 which permit the holders to adjust themselves to the articles 90. A stop screw 91 is threaded through one of the arms 84 for adjustably limiting the closing movements of the tong arms and is so adjusted that the bottles are freely or loosely held by the tongs.

The means for opening and closing the tongs includes a stationary cam plate 92 keyed to the post 31. A rock arm 93 mounted to a rock on the pivot 43, carries a cam follower roll 94 which runs on the cam 92. A pair of intermeshing gear segments 95 are connected to the pivot pins 85 for rotation with the tong arms 84. A rod 96 is pivoted at one end to one of the gears 95 and at its opposite end to a lug on the arm 93. With this construction the rocking movement of the arm 93 under the control of the cam 92 operates through the arm and link 96 for opening and closing the tongs. A rod 98 comprising telescoping sections is pivotally connected at its opposite ends to the arm 93 and the frame 42 respectively. A coil spring 99 mounted on one section of the rod 98 holds the arm 93 in contact with its cam 92 and thereby operates to close the tongs under the control of the cam. The latter is so shaped that the cam roll 94 runs off the cam after a pair of tongs has picked up a pair of bottles from the open mold. This permits the spring 99 to hold the tongs in closed position until they have carried the bottles to a discharge position over the conveyor 27. By the time such discharge position is reached the cam 92 has operated to open the tongs sufficiently to release the bottles to the conveyor. As the tongs continue their travel they are opened wide enough to clear the bottles on the conveyor as the tongs are withdawn from over the conveyor. As shown in Fig. 1 the holders 86 engage the bottle necks beneath the bottle finish (the upper beaded end of the bottle neck) permitting the bottles to be securely held during the transfer without being tightly gripped by the holders or subjecting the articles to pressure which might mar or distort them while they are still hot and in a plastic condition.

The bottle holders 86 travel in a path which is tangent or substantially tangent to the path of the finishing molds or mold cavities which rotate about the axis of the blowing machine. More particularly, the pivots 87 of the holders while passing through the station A are moving in an arc tangent to an arc 100 concentric with the mold carriage. The arc 100 is intermediate the parallel arcs 101 and 102 which represent the paths of the closed mold cavities and which are tangent respectively to the arcs in which the bottles 90 are travelling when brought to the transfer station.

The linear speed of the conveyor 27 is substantially less than that of the molds. The transfer mechanism is designed to speed up the transfer tongs as they approach the take-out position and slow them down as they approach the discharge position over the conveyor 27, so that the tongs will be moving with and at the same speed as the molds when the bottles are picked up and will be slowed down to the speed of the conveyor 27 while the bottles are being discharged thereon. The variation in the speed is under the control of the cam 47 as heretofore noted. As a pair of tongs approaches the transfer station A the tong carrying frame 42 is being swung in a forward direction about its pivot 43 in addition to its bodily movement about the axis of the turret thus giving a comparatively rapid movement to the tongs. This forward swinging movement of the frame 42 may be continued until the position B is reached. Thereafter the movement is slowed down as the discharge station C is approached so that when the tongs are over the conveyor the bottles are discharged thereon without danger of being tipped over. For example, under the shape of cam 47 herein illustrated, the rate of movement of the bottle is so controlled that as the tongs release it at the discharge station C it has decelerated to about one-half the rate it was moving when picked up by the tongs from the mold. The comparatively slow movement of the tongs may be continued a sufficient distance beyond the discharge point to prevent interference between the tongs and the bottles on the conveyor. After the position D is reached the tongs are again accelerated.

The mold carriage 22 is continuously rotated horizontally by power supplied through the ring gear 50 which drives the carriage. The finishing molds 24 are opened and closed under the control of a stationary cam track 104 (Fig. 4). While a finishing mold is being opened for the transfer of the bottles 90 at the station A, the bottles are held in upright position on the mold bottom 105 (Fig. 5) by means of suction. The suction is applied through a suction line 106 extending to openings 107 through the mold bottom. The suction may be applied immediately before a finishing mold opens and is discontinued as the transfer holders 86 grasp the bottles. At approximately the same time as the vacuum is released the bottom plates 105 are lowered a short distance so that the bottles will not drag across the bottom plates on account of the latter being recessed.

Modifications may be resorted to within the spirit and scope of my invention.

I claim:

1. An article take-out and transfer mechanism comprising a turret mounted for rotation about a vertical axis, a pair of tongs, a tong carrying frame on which the tongs are mounted for opening and closing movement, said frame being pivotally mounted on the turret for swinging movement about a vertical axis spaced laterally from the axis of the turret, a stationary cam formed with a cam track positioned between said axis of the turret and the path of movement of the pivot about which the tong carrying frame swings, a cam follower roll carried on said frame and running on said cam track and thereby providing means for swinging said frame about its axis during the rotation of the turret, means for automatically opening and closing the tongs at predetermined positions during the rotation of the turret, the tongs being pivoted to the said frame for swinging movement about laterally spaced pivots, gears interconnecting the tongs for rotation about said pivots, a second stationary cam, and means forming operating connection between said second cam and said gears.

2. An article take-out and transfer mechanism comprising a turret mounted for rotation about a vertical axis, a transfer unit comprising a frame pivotally mounted on the turret with its pivot spaced radially outward from the said axis, article gripping arms pivoted to said frame for swinging movement to and from an article gripping position, a stationary cam having a cam track interposed between the axis of the turret and the said pivot of the said frame, and a cam follower roll carried by said frame and running on said cam track, said cam track formed to swing the said frame and the article gripping arms thereon as a unit about said pivot of the frame during the rotation of the turret, thereby accelerating the movement of the gripping arms during a portion of their travel circumferentially of the turret axis and retarding their movement during another portion of said travel.

3. The mechanism defined in claim 2, said mechanism including a second stationary cam and means providing operating connections between said second cam and the article gripping arms for swinging the latter about their pivots to and from article gripping position.

4. The mechanism defined in claim 2, said mechanism including intermeshing gears connected respectively to the article gripping arms, a second stationary cam, and means providing operating connections between the second cam and said gears, said second cam being formed to swing the gripping arms about their pivots to and from article gripping position during the rotation of the turret.

5. The mechanism defined in claim 3, the said second cam being shaped to move the gripping arms to article gripping position when the transfer unit is at one position during its rotation with the turret and to release said arms when the transfer unit is at a take-out station diametrically opposite from the article gripping station.

6. The mechanism defined in claim 3, the first mentioned cam being shaped to decelerate the movement of the transfer unit as it approaches a discharge station and accelerate said unit during its travel from the discharge station to an article gripping station.

7. An article take-out and transfer mechanism comprising a turret mounted for rotation about a vertical axis, a plurality of take-out units each comprising a frame pivoted to the turret, the pivots of said frames being uniformly spaced and positioned in a circle concentric with the said axis of the turret, each unit comprising a pair of article gripping arms pivoted to the said frame for swinging movement to and from article gripping position, a stationary cam comprising a cam track surrounding the axis of the turret, cam follower rolls individual to said take-out units and carried thereby, said rolls running on said cam track, said cam track being shaped to swing the said frames about their axes and thereby accelerate the forward movement of the gripping arms about the axis of the turret during a portion of their travel and decelerate their movement about said axis during another portion of their travel.

8. The mechanism defined in claim 7, including a second stationary cam, and means operated by said second cam for swinging the article gripping arms to article gripping position at a take-out station and for swinging the arms to open position at a discharge station.

9. The apparatus defined in claim 8, the said stations being at diametrically opposite positions, said mechanism including more than two of said take-out units.

10. The mechanism defined in claim 8, the said second stationary cam being shaped to move the gripping arms of each transfer unit to article gripping position when said transfer unit is at one position during its rotation with the turret and to release said arms thereof when transfer unit is at a take-out station, said take-out station being advanced at least 90° of rotation beyond said position for moving said arms to their gripping position.

11. The mechanism defined in claim 10, characterized by having the first mentioned cam shaped to decelerate movement of each said transfer unit so that its rate of movement when its said gripping arms release at the take-out station is decreased to substantially one-half its rate of movement at the said position during its rotation corresponding to its said gripping arms being moved to article gripping position.

12. The mechanism defined in claim 11, characterized by having four said take-out units, the pivots of the frames of said units being spaced and positioned at quadrants of said circle concentric with the axis of the turret.

References Cited in the file of this patent

UNITED STATES PATENTS

| | | |
|---|---|---|
| 1,461,222 | Myers | July 10, 1923 |
| 1,619,729 | Howard | Mar. 1, 1927 |
| 1,654,091 | Peiler | Dec. 27, 1927 |
| 1,808,689 | Stenhouse et al. | June 2, 1931 |
| 2,112,119 | Rowe | Mar. 22, 1938 |
| 2,307,517 | Langer et al. | Jan. 5, 1943 |
| 2,328,873 | Young | Sept. 7, 1943 |
| 2,359,432 | McNamara | Oct. 3, 1944 |
| 2,438,088 | Wyss | Mar. 16, 1948 |
| 2,500,083 | MacConnell | Mar. 7, 1950 |
| 2,609,943 | Winder | Sept. 9, 1952 |